May 12, 1931. F. FREDENDALL 1,805,138
COUPLING PIN
Filed March 22, 1929.
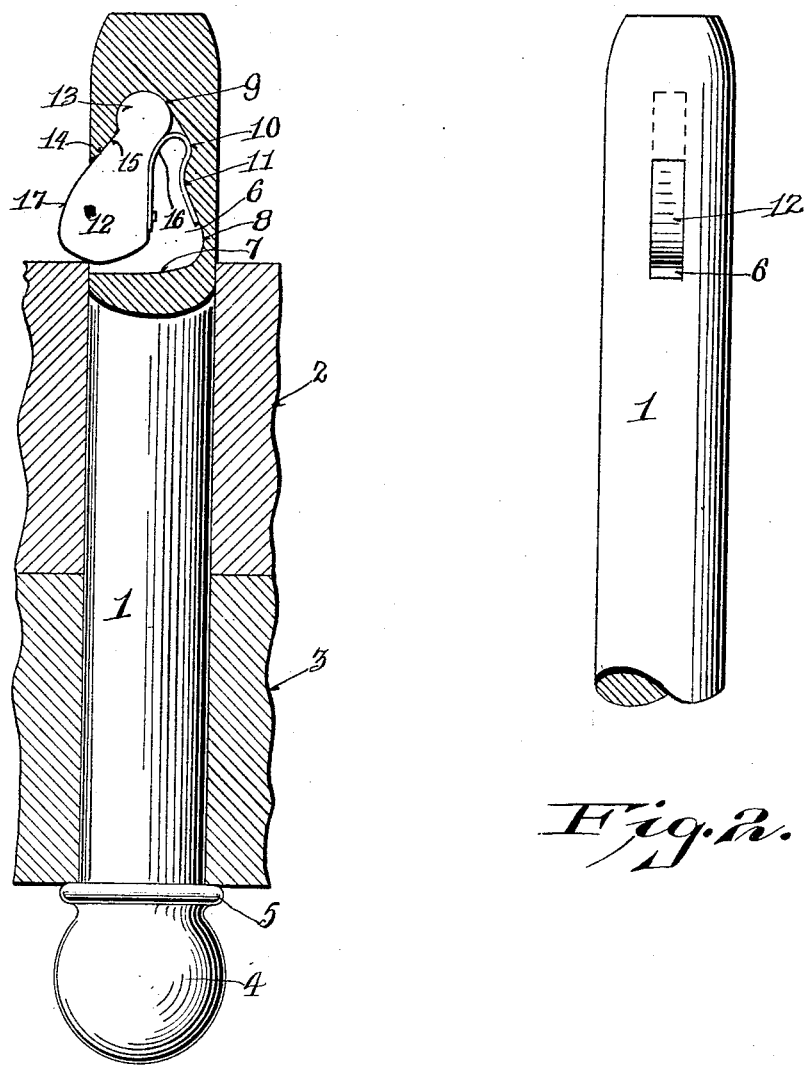

Patented May 12, 1931

1,805,138

UNITED STATES PATENT OFFICE

FIELD FREDENDALL, OF KAUKAUNA, WISCONSIN

COUPLING PIN

Application filed March 22, 1929. Serial No. 349,253.

This invention relates to new and useful improvements in coupling pins.

One of the objects of my invention is the provision of an improved type of coupling pin adapted to be used similar to the well known type of cotter pin or similar coupling pins and is so constructed as to be readily inserted in an opening and provided with means whereby it will be self-locking to prevent its withdrawal.

A further object of the invention is the provision of a coupling pin adapted to be used in various ways for replacing the ordinary cotter pin and similar fastening members and which is provided with a spring actuated catch adapted to be protracted from the locking pin after the pin has been placed in position in order to prevent the withdrawal of the pin until the catch has been manually actuated for releasing the pin.

A still further object of the invention is the provision of a coupling pin formed adjacent one end with a cavity in which is positioned a spring actuated catch member normally urged from the cavity to a point beyond the contour of the pin, so that when the pin is passed through an opening, the catch member will extend beyond the contour of the pin to form a stop to prevent withdrawal of the pin until the catch member has been returned to the cavity.

With the above and other objects in view, the invention consists in the novel features of construction, the combination and arrangement of parts hereinafter more fully set forth, pointed out in the claim and shown in the accompanying drawings wherein:

Figure 1 is a side elevation of a coupling pin constructed in accordance with my invention and illustrating its use, with parts thereof broken away and illustrated in cross section;

Figure 2 is a side elevation of a portion of the pin taken at right angles to the showing in Figure 1.

Referring now more particularly to the drawings, wherein I have used various reference characters to designate the several parts, 1 indicates the pin and in the present instance the pin is illustrated as passed through an opening in two adjacent parts 2 and 3 which are to be coupled together. One end of the pin is formed with a head 4 and with an annular flange 5, adapted to bear against one of the parts to be coupled so as to retain the pin against movement in one direction.

The pin adjacent the end opposite the head 4 is formed with a cavity 6 opening out through one side of the pin with one end of the cavity extending substantially transversely of the pin as shown at 7 with a slight curved portion 8 at the inner end of the transverse portion 7.

The outer end of the cavity is formed with an arcuate seat 9 and adjacent this seat is a recess 10 with one end thereof leading onto the curved shoulder 11.

Positioned within the cavity and normally projecting beyond the contour of the pin 1 is a catch member 12, one end of which is rounded to fit within the seat 9 to permit a rocking movement of the catch 12 with its pivot point centrally of the rounded end 13. The outer end of the catch is enlarged and is provided at a point between the enlarged end and the rounded end with a substantially straight portion 14 adapted to normally bear against an inclined shoulder 15 formed on one wall of the cavity and extending between the outlet of the cavity 6 and the seat 9. The inclination of the wall is of such dimension as to permit enough of the catch member 12 to project beyond the contour of the pin to form a positive stop for engaging one side of the parts to be coupled to positively prevent withdrawal of the pin.

The catch member 12 is urged outwardly by means of a substantially U-shaped spring 16, one side of which is engaged with the inner side of the catch member 12 and is secured thereto, while the other side is slightly curved to conform to the curved parts 10 and 11 of the inner wall of the cavity. Thus, the spring 16 is normally under compression and at all times urges the catch member 12 to its outermost position as shown in Figure 1. However, it will be noted that the outer face of the enlarged part of the catch is slightly rounded as at 17 so that when the pin 1 is passed through an opening, such as illustrated in Figure 1, the rounded part will be engaged by the walls of the opening through which the pin is passed to force the catch member 12 into the cavity 6, but as soon as the catch member is released, it will spring outwardly to its operative position as shown in Figure 1, forming a stop to prevent withdrawal of the pin 1 until the catch member is manually forced inwardly into the cavity 6 against the tension of the spring 16.

It will be apparent from the foregoing that I have provided a simple and inexpensive connecting pin which can be used in various ways and can be quickly and easily inserted in position and locked in position against incidental displacement, but can be quickly and readily withdrawn through manual actuation of the catch 12.

I claim:

A coupling pin having a cavity extending through one wall, one end wall of the cavity extending transversely of the pin and the other wall rounded to form an arcuate seat, a catch member formed with a rounded head adapted to be loosely mounted in the arcuate seat, the inner longitudinal wall of said cavity having a curved shoulder with oppositely curved portions upon the sides of the shoulder, a U-shaped spring having one side conforming to the inner wall of the cavity and the other side bearing against the catch member to normally project a portion of the catch member beyond the outer surface of the pin, the normally extending portion of the catch member having a rounded surface adapted to be engaged for moving the catch member into the cavity within the outer contour of the pin, and means for limiting the movement of the catch member from the cavity.

In testimony that I claim the foregoing I have hereunto set my hand at Kaukauna, in the county of Outagamie and State of Wisconsin.

FIELD FREDENDALL.